(12) United States Patent
Lu

(10) Patent No.: US 10,791,704 B2
(45) Date of Patent: Oct. 6, 2020

(54) PET CARRYING BAG FOR INSTALLATION TO A BICYCLE HANDLE BAR

(71) Applicant: Kongzhi Lu, Fujian (CN)

(72) Inventor: Kongzhi Lu, Fujian (CN)

(73) Assignee: Xiamen Sunnypet Products Co., Ltd., Xiamen (CN)

( * ) Notice: Subject to any disclaimer, the term of this patent is extended or adjusted under 35 U.S.C. 154(b) by 178 days.

(21) Appl. No.: 16/058,865

(22) Filed: Aug. 8, 2018

(65) Prior Publication Data

US 2019/0045741 A1    Feb. 14, 2019

(30) Foreign Application Priority Data

Aug. 11, 2017  (CN) .......................... 2017 1 0684919

(51) Int. Cl.
*A01K 1/02* (2006.01)
*B62J 9/21* (2020.01)

(52) U.S. Cl.
CPC .......... *A01K 1/0281* (2013.01); *A01K 1/0254* (2013.01); *B62J 9/21* (2020.02)

(58) Field of Classification Search
CPC .. A01K 1/0281; A01K 1/0254; A01K 1/0236; A01K 1/0272; B62J 7/06; B62J 9/21; B62J 11/20
USPC ......... 119/496, 497, 498, 474; 224/420, 421
See application file for complete search history.

(56) References Cited

U.S. PATENT DOCUMENTS

| | | | | |
|---|---|---|---|---|
| 4,010,880 A | * | 3/1977 | Guillot-Munoz | A01K 1/0272 224/275 |
| 5,305,710 A | * | 4/1994 | Ward, Jr. | B62J 99/00 119/771 |
| 5,577,646 A | * | 11/1996 | White | B62J 11/00 224/422 |
| 5,718,191 A | * | 2/1998 | O'Donnell | A01K 1/0281 119/771 |
| 5,810,227 A | * | 9/1998 | Jorgensen | A01K 1/0281 224/413 |
| 6,179,183 B1 | * | 1/2001 | Kloster | B62J 9/22 224/433 |
| 6,425,349 B1 | * | 7/2002 | Laskin | A01K 1/0245 119/496 |
| 2008/0257276 A1 | * | 10/2008 | White | A01K 1/0281 119/496 |

* cited by examiner

*Primary Examiner* — Trinh T Nguyen
(74) *Attorney, Agent, or Firm* — Jen-Feng Lee, Esq.

(57) ABSTRACT

Present invention provides a pet carrying bag utilizing first tie bands and second tie band to provide means for securing the bag to a bicycle handle bar when looping the bands around the handle bar and clicking the insertion prongs to the receiving insertion shells. Such installation mechanism allows for tight and secure fit to bicycle handle bars of different configurations. The bag body is made of flexible materials with rigid back board and bottom board embedded inside the flexible material, for easy fold-down and storage. During regular usage, two movable boards can be set, by using common Velcro pieces, to prop the bag open, creating a maximum space for the pets.

11 Claims, 9 Drawing Sheets

US 10,791,704 B2

PET CARRYING BAG FOR INSTALLATION TO A BICYCLE HANDLE BAR

PRIORITY CLAIM TO FOREIGN APPLICATION

Applicant hereby makes priority claim to a Chinese application, number CN201710684919.0, having the Chinese filing date of Aug. 11, 2017.

FIELD AND BACKGROUND OF THE INVENTION

In today's constantly jammed road traffic around metropolitan areas, the use of bicycles has been recognized as practical, convenient and environmentally friendly. When this mode of transportation is chosen for outdoors activities, many people would enjoy the companion of their pets. As such, a carrying bag for pets that can go with the use of bicycles becomes quite desired by the consumers.

Some commercial bicycle-related pet carry bags exist on the market. They, however, have the following downsides: (1) the placement of the bags to the bicycles is not secure or stable, causing discomfort to the pets and safety issues to the riders of the bicycle; (2) different bikes have different shapes or configurations in the handle bar portion and pose a problem to pet owners for making sure their pet carrying bags can be fitted to their bikes securely; (3) even if some pet carrying bags provide easy and secure way of installing to the bicycles, such bags usually are made of hard or rigid materials that do not allow folding down for storage and transportation when not being used.

Present invention provides a real-world solution that overcomes the deficiencies stated herein.

SUMMARY OF THE INVENTION

The invention relates to a pet carrying bag made of flexible material with a rigid back board and a rigid bottom board embedded inside the flexible material. Such construction allows for easy fold-down of the carrying bag when not in use.

Two first tie bands extending from the right and left sides of the bag body, each of said first tie band further having a first fixed end and a first moving end. A first insertion prong is formed at the distal tip of said first moving end.

Two first insertion shells are formed on the right and left sides of the bag body. Each of said first insertion shell is made to receive a first insertion prong.

The way the insertion prongs is inserted into the insertion shells is similar to many child booster seat locking straps, or kids' life vest locking straps, and thus quires no more disclosure. A bicycle rider can loop the first tie bands around the end of a bicycle handle bar, on both the left and right sides, clicking the first insertion prong into a respective first insertion shell, thus tightening the carrying bags to the handle bar on both ends of the handle bar.

At least one second tie band is provided, being placed slidably through the "eye hole" of a clink band at the back side of the carrying bag.

The at least one second tie band has two second moving ends; each of said second moving end further having a second insertion prong. The second tie band has sufficient length to loop around a bicycle handle bar or a vertical turn rod of a bicycle, suitable to fit the different configurations of different bicycle handle bars.

The bag body further has a movable left board and a movable right board placed inside the carrying bag body where one end of the boards are connected to the inside back ball of the bag body, allowing a limited pivoting motion.

Commercially available Velcro pieces can be utilized to fix the two movable boards to the side walls on both sides, maintaining a maximal amount of space for regular usage.

Two ear clasps are formed on the outside, which, in conjunction with a shoulder strap, allow for regular shoulder-carry purpose, A pull cord is provided to control the central opening on top of the bag, allowing the rider to either complete put the pet inside, or allowing the pet's head, or some portion of the upper body, to remain outside.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 1:
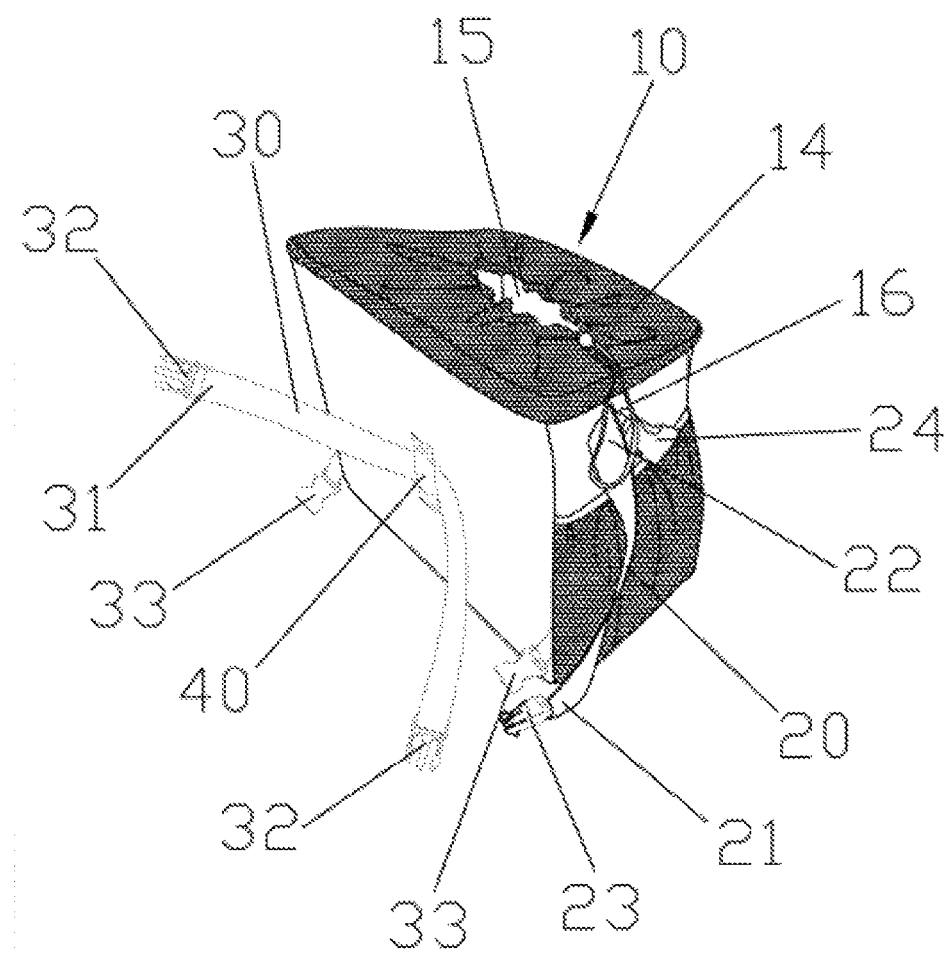
FIG. 1 shows a perspective view of the pet carrying bag of present invention from the back side.
Figure 2:
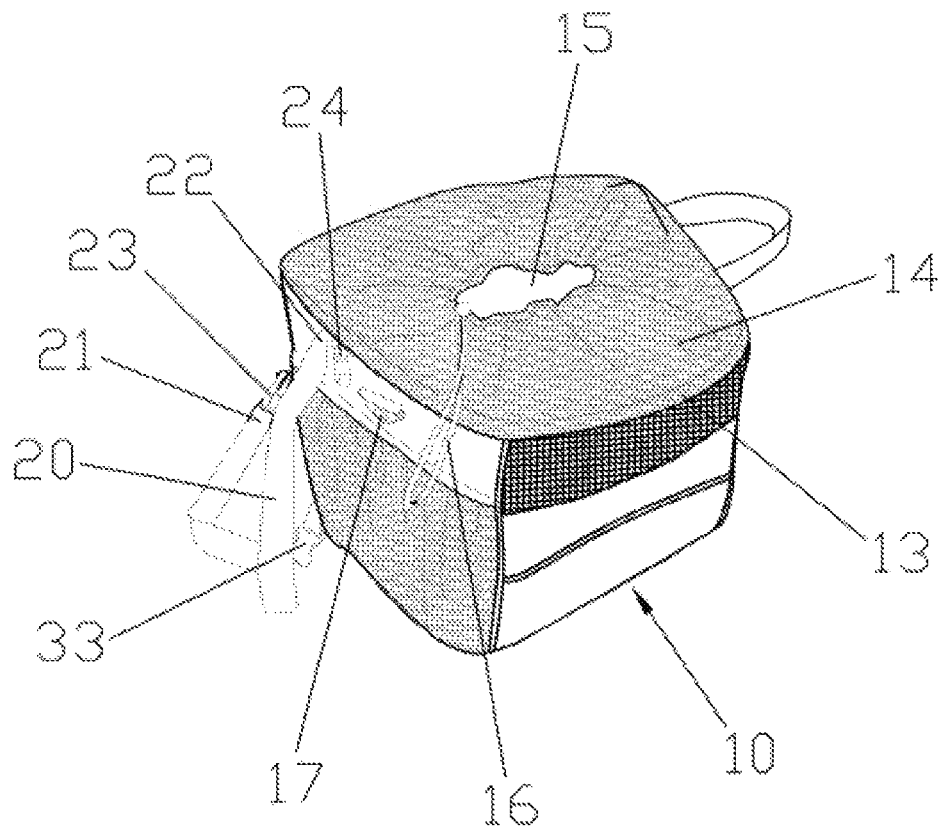
FIG. 2 shows a perspective view of the pet carrying bag of present invention from the upper front side.

As shown in the FIGS. 1-2, present invention teaches a pet carrying bag made of flexible material suitable for carrying a pet, or pets, inside the inner space of the bag. There is no limitation as to what type of materials can be used. Persons reasonably skilled in the art can use commercially available materials for this purpose.

The flexible material forms a body 10 that has a rigid back board and a rigid bottom board embedded inside the flexible material. These two rigid boards provide the basic shape and propping force to give the bag its needed "space" for holding content, such as pets, inside the bag.

The rigid back board and the rigid bottom board are embedded inside the flexible material and require no more disclosure for people reasonably skilled in the art. As such, no drawing is provided to show the rigid back board or the rigid bottom board.

Two first tie bands 20 extending from the right and left sides of the body 10. Each of said first tie band 20 further has a first fixed end 22 and a first moving end 21, where a first insertion prong 23 is formed at the distal tip of said first moving end 21.

Two first insertion shells 24 are formed on the right and left sides of the body 10. Each of said first insertion shell 24 is made to receive a first insertion prong 23.

The way the insertion prongs 23 is inserted into the insertion shells 24 is similar to many child booster seat locking straps, or kids' life vest locking straps and thus require no more disclosure. In actual usage, a rider can loop the first tie bands around the end of a bicycle handle bar, on both the left and right sides, clicking the first insertion prong 23 into a respective first insertion shell 24, thus tightening the carrying bags to the handle bar on both ends of the handle bar.

Figure 3:
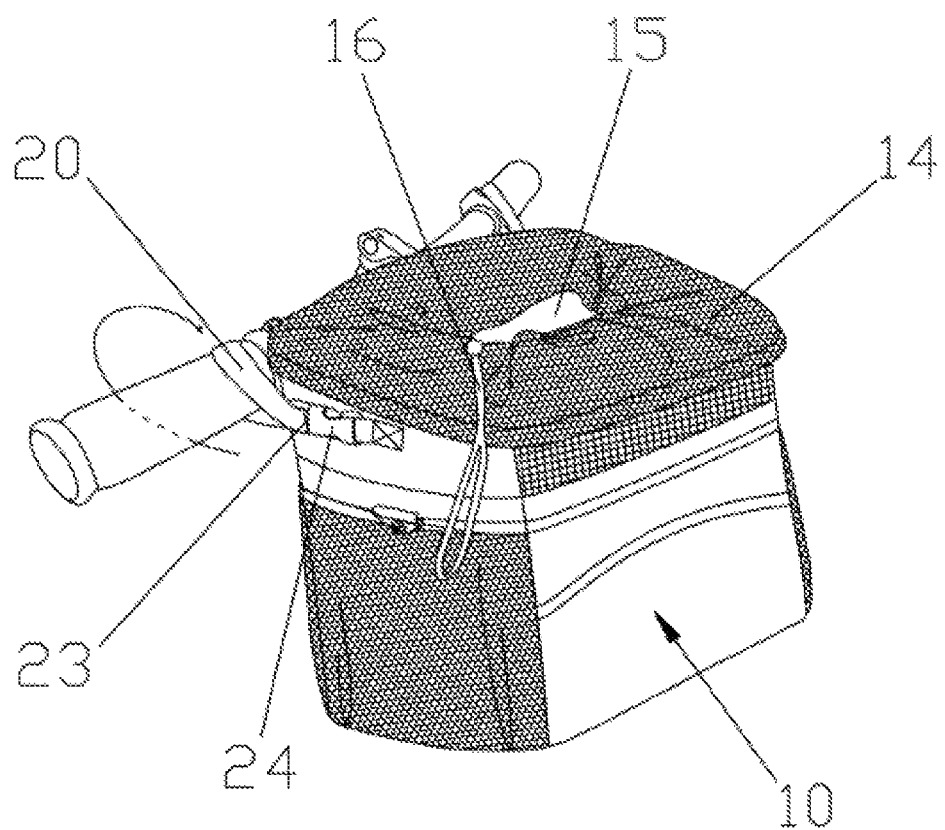
FIG. 3 shows the pet carrying bag of present invention installed on a bicycle handle bar.
Figure 6:
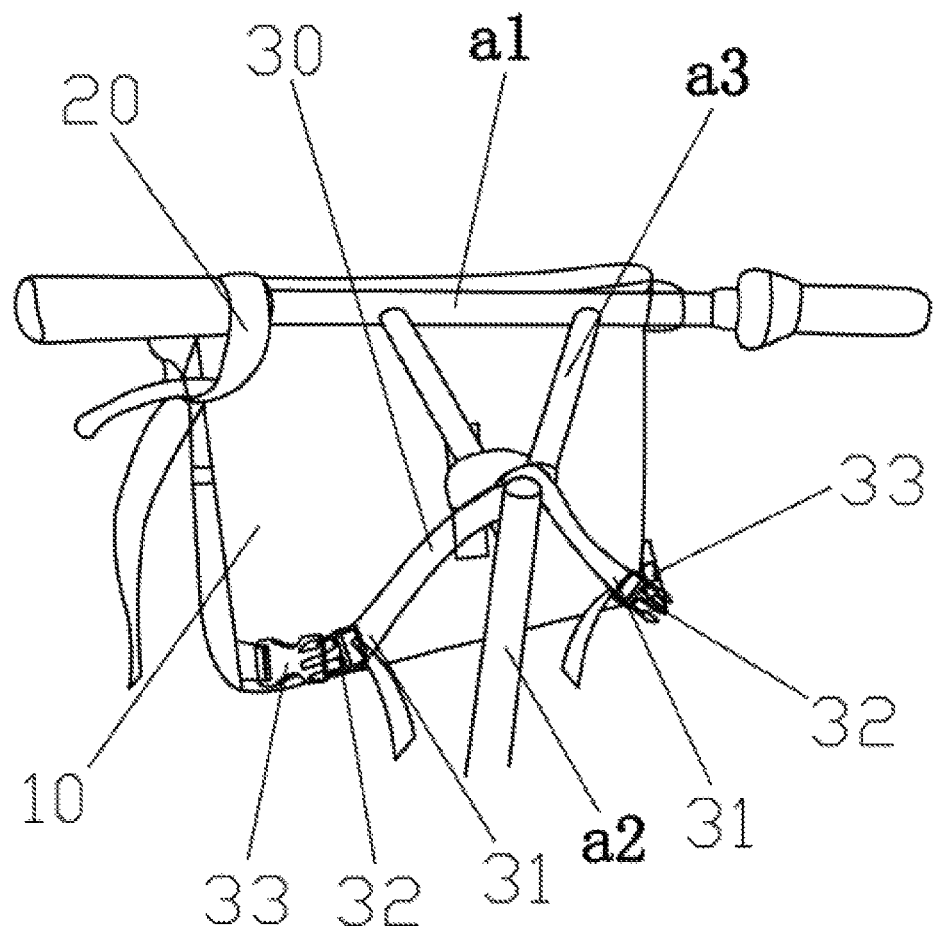

As shown in FIGS. 3 and 6, the two first tie bands 20 will be looped around/over a bicycle handle bar (there are at least 3 handle bar configurations, discussed later), the first insertion prong 23 will be "clicked" into a first insertion shell 24, thus producing a securing and tying force to stabilize the body 10.

Figure 4:
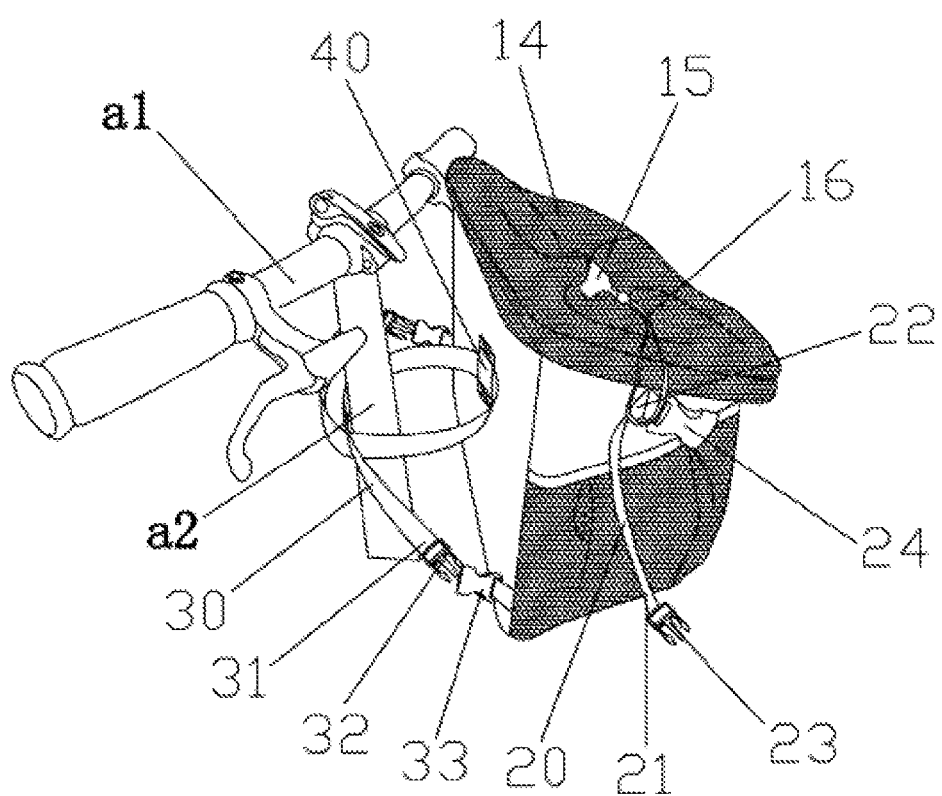
FIGS. 4-6 show the exemplary ways of installing the pet carrying bag of present invention to three different types of bicycle handle bar configurations.

The body 10 has at least one second tie band 30 that has two second moving ends 31; each of said second moving end 31 further having a second insertion prong 32. The second tie band 30 has sufficient length to loop around a bicycle handle bar or a vertical turn rod of a bicycle, as shown in FIGS. 3 and 4.

Two second insertion shells 33 are located on the right and left sides of the back of the body 10, as shown in FIG. 1. The embodiment shown herein indicated the location to be at the lower corners of the body 10; though the location of upper corner can be another embodiment.

Each of said second insertion shell 33 is made to receive a second insertion prong 32.

A cling band 40 is made on the back of the body 10 for slidably receiving said at least one second tie band 30. As shown in FIGS. 1 and 4, said at least one second tie band 30 is slidably received within the "loop" space created by the cling band 40. When the second moving end 31 is wrapped around a bicycle handle bar (there are at least 3 handle bar configurations, discussed later), the second insertion prong 32 will be "clicked" into the second insertion shell 33, producing a securing and tying force to keep the body 10 relatively stable.

A support ring 13 is made around the top edge of said body 10, propping up a top netting 10 with a central opening 10. The size of the central opening 10 can be controlled by a pull cord 16.

The cling band 40 is located on a point off the straight line between the two points where the first tie bands 20 are extending out from the right and left side of the body 10. As shown in FIG. 1, the two points of the first tie bands 20 are at the bottom back side of the body 10, whereas the cling band 40 is generally in the middle of the back side of the body 10.

Figure 9:
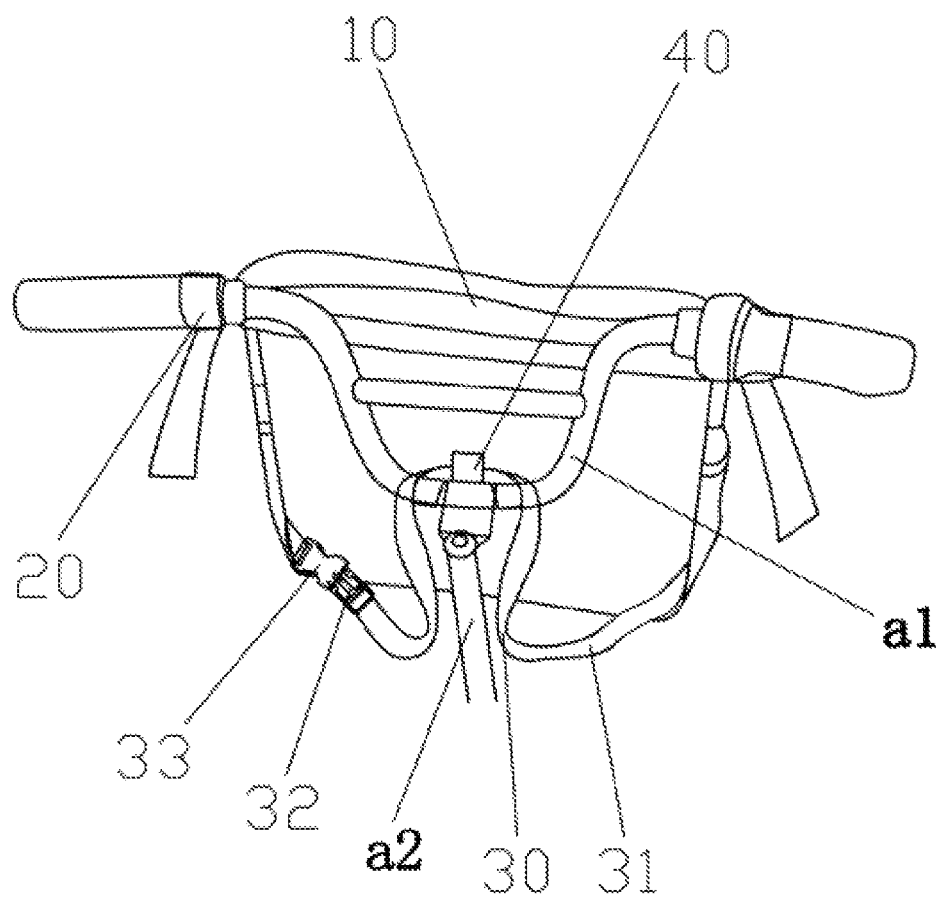
FIG. 9 shows the pet carrying bag of present invention with a different embodiment of the second tie band.

As another embodiment, shown in FIG. 9, the at least one second tie band 30 can be made to extend out from one side of the body 10 (generally from the back side) and has only one second moving end 31 that contains a second insertion prong 32 at the distend tip of the second moving end 31. On the other side of the body 10, a second insertion shell 33 is located so that the second insertion prong 32 can be inserted, or "clicked", into the second insertion shell 3. The second tie band 30 of this embodiment has sufficient length to loop around a bicycle handle bar or a vertical turn rod of a bicycle;

As another embodiment, a second cling band 40 can be made to exist on the back of the body 10 to allow additional tightening of the bag to a bicycle when looping said at least one second tie band 30. As such, looping said at least one second tie band 30 through two cling bands 40 will increase the tightness when the body 10 is being secured to the bicycle handle bar.

Figure 7:
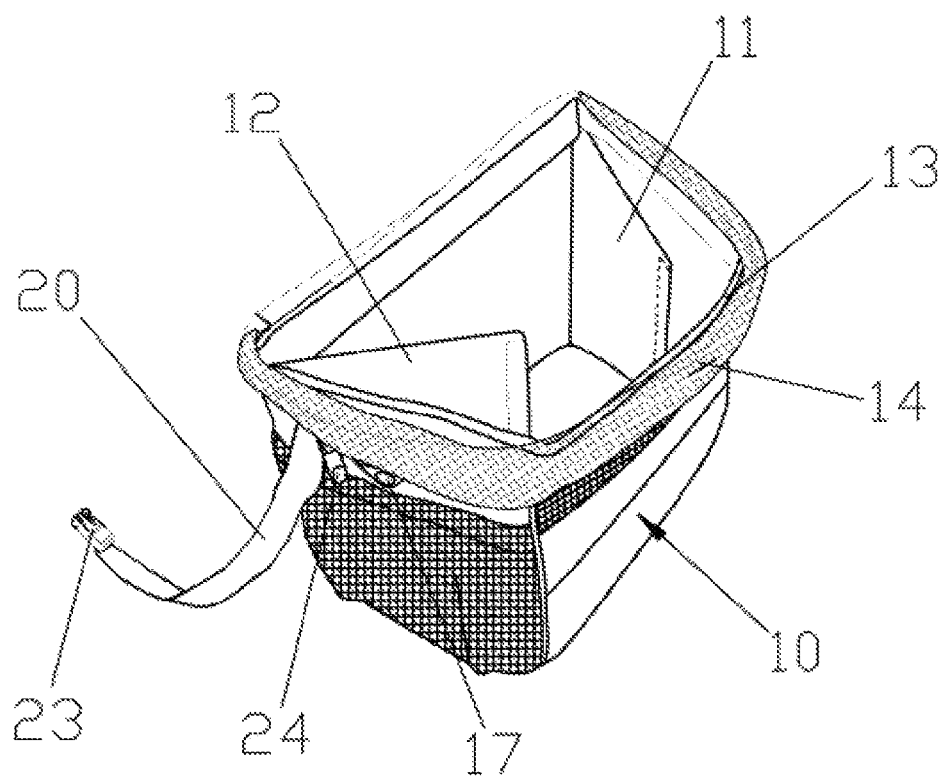
FIG. 7 shows the movable left board and movable right board inside the pet carrying bag.

The body 10 further has a movable left board 11 and a movable right board 12 placed inside the body 10 where one end of the boards are connected to the inside back ball of the body 10, allowing a limited pivoting motion. FIG. 7 shows such construction of the two movable boards 11 and 12.

Commercially available Velcro pieces can be utilized to fix the two movable boards 11 and 12 to the side walls on both sides, maintaining a maximal amount of space.

Figure 8:
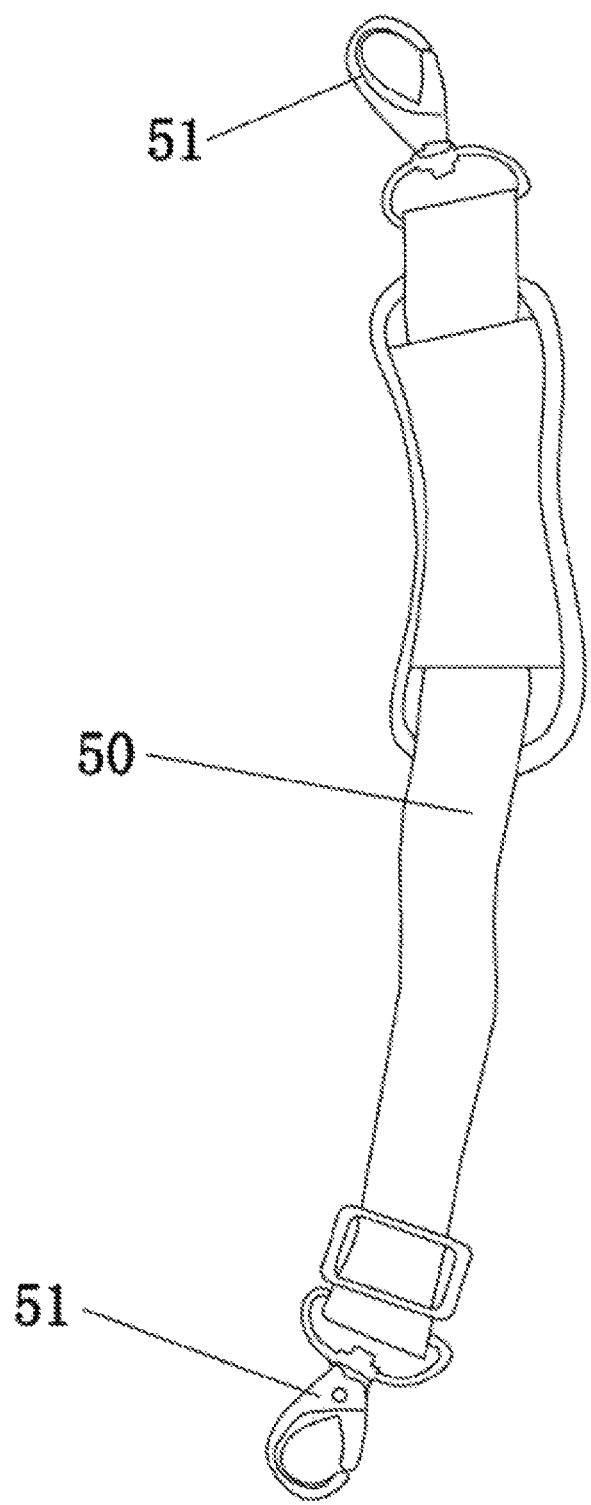
FIG. 8 shows the parts related to the shoulder strap with two connection claws.

On the outside of the body 10, two ear clasps 17 are formed, one on the right side and one on the left side of the body 10. A shoulder strap 50 can be used along with this pet bag when the two connection claws 51 are sized to fit into the ear clasps 17; as shown in FIG. 8.

Figure 5:
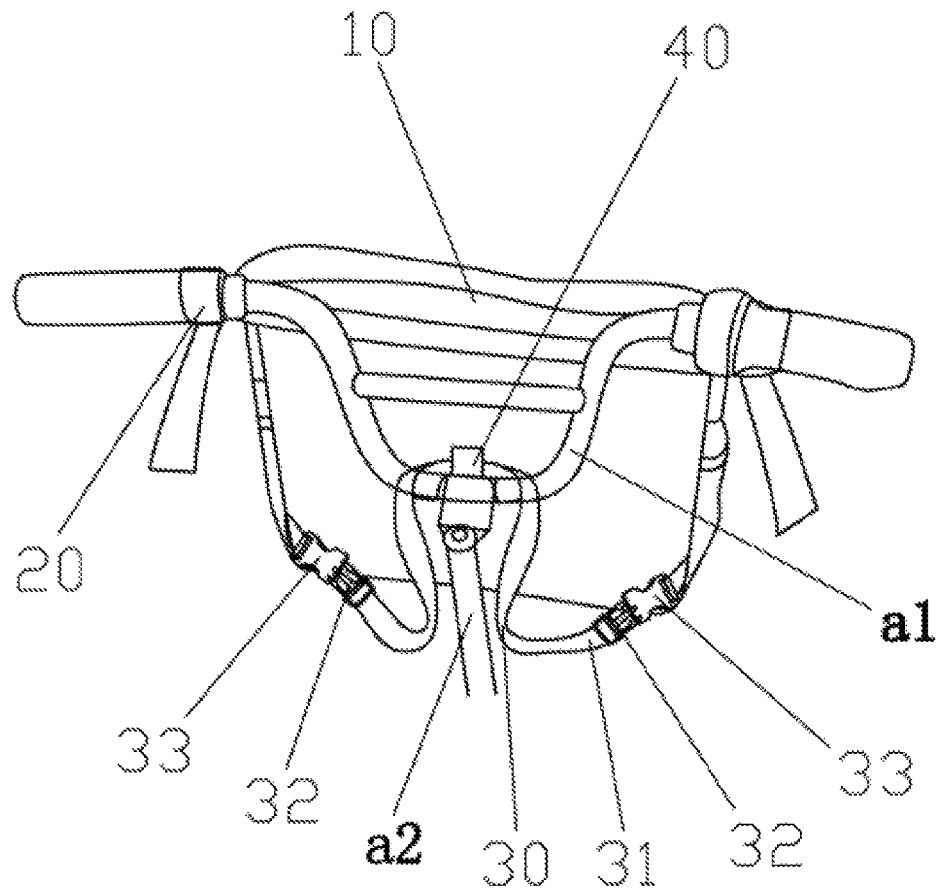

Utilization of present invention is not affected by different bicycle handle bar configurations. FIGS. 4-6 show different types of bicycle handle bar configurations.

FIG. 4 shows a straight handle bar a1 on top of a vertical turn rod a2. The second tie band 30 is looped around the vertical turn rod a2. FIG. 4 also shows the second insertion prong 32 in a "almost clicked" position to a matching second insertion shell 33.

FIG. 5 shows a curved handle bar a1. The second tie band 30 is looped differently over such curved handle bar a1.

FIG. 6 shows a straight handle bar a1 connected to a v-connector a3 then to a vertical turn rod a2. The second tie band 30 is looped differently over said v-connector a3. FIG. 6 also shows a first tie band 20 being tied and looped over the left side of the handle bar a1 in such configuration.

For ease of reference, the numbered elements of the invention are identified below:
10 bag body
11 left board
12 right board
13 support ring
14 top netting
15 central opening
16 pull cord
17 ear clasp
20 first tie band
21 first moving end
22 first fixed end
23 first insertion prong
24 first insertion shell
30 (at least one) second tie band
31 second moving end
32 second insertion prong
33 second insertion shell
40 cling band
50 shoulder strap
51 connection claw
a1 handle bar
a2 vertical turn rod
a3 v-connector

The invention claimed is:

1. A pet carrying bag made of flexible material, comprising:
   a body having a rigid back board and a rigid bottom board embedded inside the flexible material;
   two first tie bands extending from the right and left sides of the body, each of said first tie band further having a first fixed end and a first moving end, wherein a first insertion prong is formed at the distal tip of said first moving end;
   two first insertion shells are formed on the right and left sides of the body, each of said first insertion shell is made to receive a first insertion prong;
   at least one second tie band having two second moving ends, each of said second moving end further having a second insertion prong, wherein the second tie band has sufficient length to loop around a bicycle handle bar or a vertical turn rod of a bicycle;

two second insertion shells on the right and left sides of the back of the body, each of said second insertion shell is made to receive a second insertion prong;

a cling band is made on the back of the body for slidably receiving said at least one second tie band; and, a support ring is made around the top edge of said body, propping up a top netting with a central opening the size of which can be controlled by a pull cord.

2. The pet carrying bag of claim 1 wherein the cling band is located on a point off the straight line between the two points where the first tie bands are extending out from the right and left side of the body.

3. The pet carrying bag of claim 1, further comprising a second cling band on the back of the body to allow additional tightening of the bag to a bicycle when looping said at least one second tie band.

4. The pet carrying bag of claim 1, further comprising a movable left board and a movable right board placed inside the body where one end of the boards are connected to the inside back ball of the bag, allowing a limited pivoting motion.

5. The pet carrying bag of claim 4 wherein the two movable boards can be secured to the inside wall of the bag by use of Velcro pieces.

6. The pet carrying bag of claim 5 further comprising two ear clasps on the right side and left side of the bag.

7. The pet carrying bag of claim 6 further comprising a detachable shoulder strap containing two connection claws on the two ends of the strap where the connection claws are sized to fit into the ear clasps.

8. A pet carrying bag made of flexible material, comprising:

a body having a rigid back board and a rigid bottom board embedded inside the flexible material;

two first tie bands extending from the right and left sides of the body, each of said first tie band further having a first fixed end and a first moving end, wherein a first insertion prong is formed at the distal tip of said first moving end;

two first insertionshells are formed on the right and left sides of the body, each of said first insertion shell is made to receive a first insertion prong;

at least one second tie band extending out from one side of the body, further having one second moving end containing a second insertion prong at the distend tip of the second moving end, wherein the second insertion prong is to be received in a second insertion shell located on the other side of the body, and wherein the second tie band has sufficient length to loop around a bicycle handle bar or a vertical turn rod of a bicycle;

a cling band is made on the back of the body for slidably receiving said at least one second tie band; and, a support ring is made around the top edge of said body, propping up a top netting with a central opening the size of which can be controlled by a pull cord.

9. The pet carrying bag of claim 8, further comprising a movable left board and a movable right board placed inside the body where one end of the boards are connected to the inside back ball of the bag, allowing a limited pivoting motion.

10. The pet carrying bag of claim 9 wherein the two movable boards can be secured to the inside wall of the bag by use of Velcro pieces.

11. The pet carrying bag of claim 10 further comprising two ear clasps on the right side and left side of the bag.

\* \* \* \* \*